United States Patent
Weber

(10) Patent No.: US 6,462,968 B2
(45) Date of Patent: Oct. 8, 2002

(54) REVERSE CONDUCTING GCT (GATE COMMUTATED THYRISTOR) AND APPLICATION OF SUCH A GCT

(75) Inventor: André Weber, Olten (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 09/955,962

(22) Filed: Sep. 20, 2001

(65) Prior Publication Data

US 2002/0060916 A1 May 23, 2002

(30) Foreign Application Priority Data

Sep. 29, 2000 (EP) .............................. 00810898

(51) Int. Cl.[7] ......................... H02H 7/122; H02M 7/44
(52) U.S. Cl. ........................... 363/58; 363/96; 363/136
(58) Field of Search ................... 363/96, 57, 58, 363/135, 136, 27, 28

(56) References Cited

U.S. PATENT DOCUMENTS

| | | |
|---|---|---|
| 3,947,726 A | 3/1976 | DeCecco et al. |
| 4,516,315 A | 5/1985 | Przybysz et al. |
| 4,545,002 A | 10/1985 | Walker |
| 4,945,463 A * | 7/1990 | Dangschat ............ 363/56 |
| 5,095,220 A * | 3/1992 | Kaifler ............ 250/551 |
| 5,731,967 A | 3/1998 | Gruning |
| 5,982,646 A * | 11/1999 | Lyons et al. ............ 363/58 |
| 6,225,791 B1 * | 5/2001 | Fujii et al. ............ 323/207 |
| 6,242,895 B1 * | 6/2001 | Fujii et al. ............ 323/207 |

FOREIGN PATENT DOCUMENTS

| | | |
|---|---|---|
| EP | 0 509 118 | 10/1992 |
| GB | 1395 528 | 5/1975 |

\* cited by examiner

*Primary Examiner*—Bao Q. Vu
(74) *Attorney, Agent, or Firm*—Burns, Doane, Swecker & Mathis, L.L.P.

(57) ABSTRACT

A current source inverter (1) comprises a bridge circuit (2) having a plurality of bridge paths (5), in each of which a controllable power semiconductor component (6) is arranged.

In the case of such an inverter, a loss in performance on account of inductance-dictated overvoltages during the turn-off of the power semiconductor components (6) is avoided by virtue of the fact that the controllable power semiconductor component (6) is avalanche-proof at least under loading in the forward direction.

11 Claims, 2 Drawing Sheets

REVERSE CONDUCTING GCT (GATE COMMUTATED THYRISTOR) AND APPLICATION OF SUCH A GCT

FIELD ON THE INVENTION

The present invention concerns the field of power electronics. It relates to a reverse conducting GCT (Gate Commutated Thyristor) in accordance with the preamble of claim 1, and also to an application of such a GCT.

BACKGROUND OF THE INVENTION

For applications in current source inverters, as are disclosed in U.S. Pat. No. 4,545,002, for example, reverse blocking power semiconductor components such as e.g. thyristors, GTOs or IGCTs (Integrated Gate Commutated Thyristors) are used (with regard to an explanation of the function and the construction of IGCTs, reference is made e.g. to an article by Harold M. Stillman, "IGCTs—megawatt power switches for medium-voltage applications", ABB Review 3 (1997)). In this case, it is possible to use both symmetrical components and a series circuit comprising an asymmetrical component and a diode. The problem in application is that a large overvoltage is induced by the commutation inductance during the turn-off into a positive voltage (in the case of GTOs and IGCTs). However, the commutation inductance can only be influenced to a limited extent since it is manifested by leakage inductances.

In the application, therefore, the overvoltage must either be controlled by the semiconductor component used, or be reduced by massive external circuitry. Both approaches lead to losses which limit the performance of the power converter.

SUMMARY OF THE INVENTION

It is an object of the invention, therefore, to provide a current source inverter which does not have the abovementioned disadvantages of known current source inverters and, in particular, whose performance is not impaired by the overvoltages produced during turn-off, and also to specify a power semiconductor component for use in such a current source inverter.

The object is achieved by means of the totality of the features of claims 1 and 3. The heart of the invention consists in using, in the bridge paths of the inverter, a power semiconductor component which is avalanche-proof at least under loading in the forward direction. This obviates, in particular, the need for providing additional circuit measures in the inverter. A series circuit comprising a reverse conducting GCT (Gate Commutated Thyristor) and a diode is preferably used.

In the reverse conducting GCT, in which a GCT section and a reverse-connected parallel diode section are integrated beside one another in a semiconductor substrate, the avalanche strength is achieved by virtue of the fact that the diode section is designed in such a way that its avalanche voltage is lower than the blocking voltage of the GCT section.

In accordance with a first preferred refinement of the GCT according to the invention, the diode section comprises, one above the other, a cathode emitter layer, a first base layer, and a first anode emitter layer, and the avalanche voltage or blocking voltage of the diode section is reduced by virtue of the cathode emitter layer being driven in a recessed manner into the semiconductor substrate or the first base layer.

Another preferred refinement is characterized in that the diode section comprises, one above the other, a cathode emitter layer, a first base layer, and a first anode emitter layer, and in that the avalanche voltage or blocking voltage of the diode section is reduced by virtue of the first anode emitter layer being driven in a recessed manner into the semiconductor substrate or the first base layer.

A further refinement of the GCT according to the invention is distinguished by the fact that the diode section comprises, one above the other, a cathode emitter layer, a first base layer, and a first anode emitter layer, and that the avalanche voltage or blocking voltage of the diode section is reduced by virtue of a reduction of the resistivity of the first base layer, the reduction of the resistivity of the first base layer preferably being effected by neutron irradiation.

Finally, it is also possible to effect the avalanche voltage or blocking voltage of the diode section by a reduction in the thickness of the semiconductor substrate in the region of the diode section.

Further embodiments emerge from the dependent claims.

DESCRIPTION OF THE INVENTION

The invention will be explained in more detail below using exemplary embodiments in connection with the drawing, in which FIG. 1 shows the circuit diagram of a current source inverter with a series circuit comprising a GCT and a diode in the bridge paths;

DETAILED DESCRIPTION OF THE INVENTION

Figure 1:
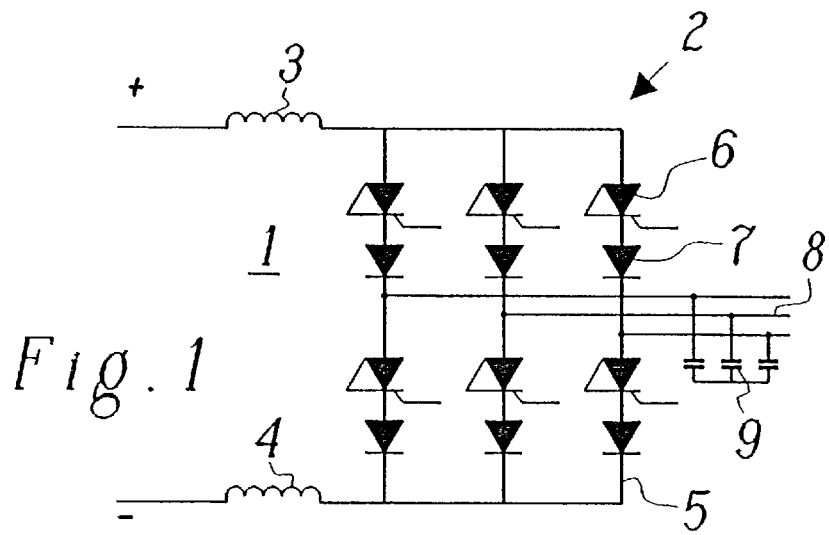

A simplified circuit diagram of a current source inverter 1 is reproduced in FIG. 1. The current source inverter 1 comprises a bridge circuit 2 (three-phase bridge circuit) having individual bridge paths 5, in which controllable power semiconductor components are arranged, which are driven in a suitable manner by a controller (not illustrated) in such a way that an AC voltage of the desired frequency is present at the AC output 8 of the inverter. On the input side, the bridge circuit 2 receives a DC current from an intermediate circuit with corresponding intermediate circuit inductances 3, 4. At the AC output, a plurality of capacitors 9 are arranged in the manner illustrated.

According to the invention, reverse conducting GCTs 6 are now provided as controllable power semiconductor components in the bridge paths 5, said GCTs each being connected in series with a diode 7 and being designed in such a way that they are avalancheproof under loading in the forward direction. In this case, the component defined by its internal structure is generally designated as GCT, while the IGCT described in the introduction is a GCT with gate driving integrated in a special way.

Figure 2:
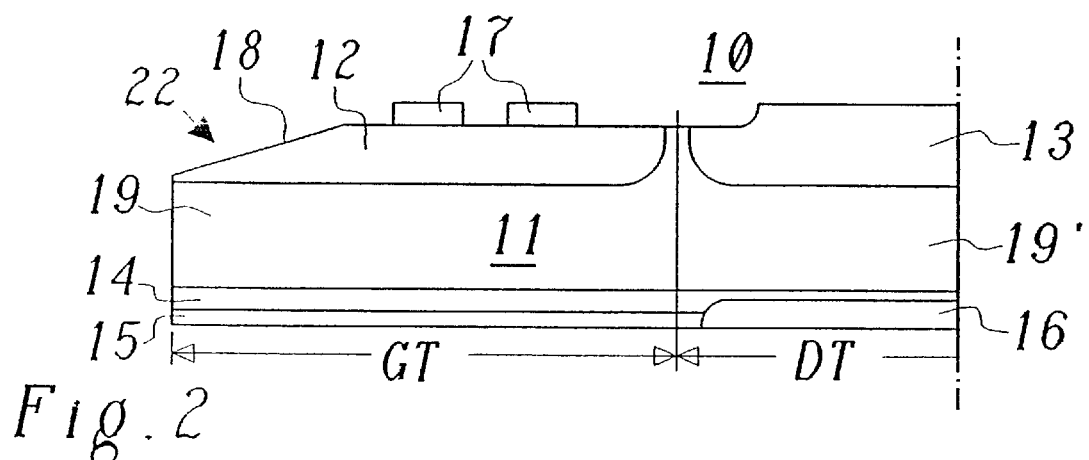
FIG. 2 shows the section through a reverse conducting GCT according to the prior art.

The internal structure of a conventional reverse conducting GCT is illustrated in section in FIG. 2, in which case—as in the further FIGS. 3 to 6 as well—hatching of the different regions and layers has largely been dispensed with. The known GCT 10 comprises a GCT section GT and a diode section DT, which are integrated beside one another in a semiconductor substrate 11. The GCT section GT concentrically surrounds the diode section DT arranged in the center and has, at its outer edge, a peripheral edge termination 22 characterized by an edge bevel 18. It is also possible for the diode section DT to surround the GCT section. The diode section DT constitutes a reverse-connected parallel diode which is reverse-biased during operation of the GCT in the forward direction. The diode section DT or the diode has, in the reverse direction, a specific avalanche voltage or blocking voltage in the case of which, when said voltage is exceeded, the avalanche breakdown commences. The GCT section GT or the GCT likewise has a blocking voltage which corresponds to the blocking voltage of the edge termination 22.

The GCT section GT and the diode section DT each have a specific sequence of layers or regions of different conductivity and charge carrier concentration which have been produced for example by mask indiffusion of impurities into the semiconductor substrate 11. In the diode section DT, the following are arranged (from the cathode to the anode) one above the other: an $n^+$-doped cathode emitter layer 16, an n-doped first base layer 19' and a p-doped first anode emitter layer 13. In the GCT section GT, the following are arranged (from the anode to the cathode) one above the other: a $p^+$-doped second anode emitter layer 15, an n-doped stop layer 14, an $n^-$-doped second base layer 19, a p-doped third base layer 12 and, distributed thereon, individual $n^+$-doped cathode emitters 17. In this case, the second base layer 19 and the first base layer 19' are part of the same $n^+$-doped base material of the semiconductor substrate 11. The third base layer 12 of the GCT section GT and the anode emitter layer 13 of the diode section DT are indiffused into the semiconductor substrate 11 to approximately the same depth. The stop layer 14 of the GCT section GT also extends through the diode section DT and covers the cathode emitter layer 16 therein.

Figure 3:
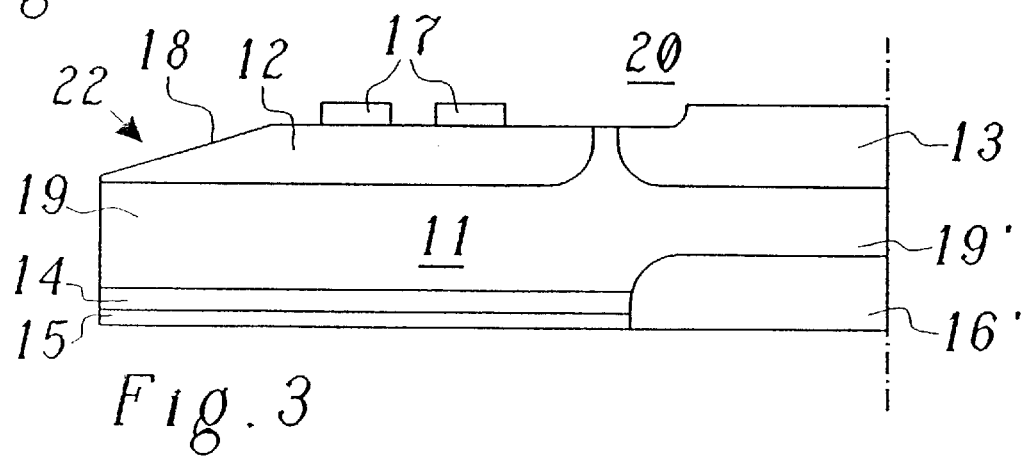
FIG. 3 shows a first exemplary embodiment of a reverse conducting GCT according to the invention with a recessed cathode emitter layer in the diode section.

Proceeding from this known structure of the reverse conducting GCT, according to the invention the avalanche voltage of the integrated diode (in the diode section DT) is now reduced by means of suitable measures to an extent such that it lies below the blocking voltage of the edge termination 22 of the GCT. This can specifically be done in different ways, as will be explained below with reference to FIGS. 3 to 6:

In the case of the reverse conducting GCT 20 in accordance with FIG. 3, the reduction of the avalanche voltage or blocking voltage of the diode is achieved by virtue of the fact that in the diode section, the cathode emitter layer 16' is driven more deeply, in particular distinctly beyond the stop layer 14, into the semiconductor substrate 11 or the first base layer 19'.

Figure 4:
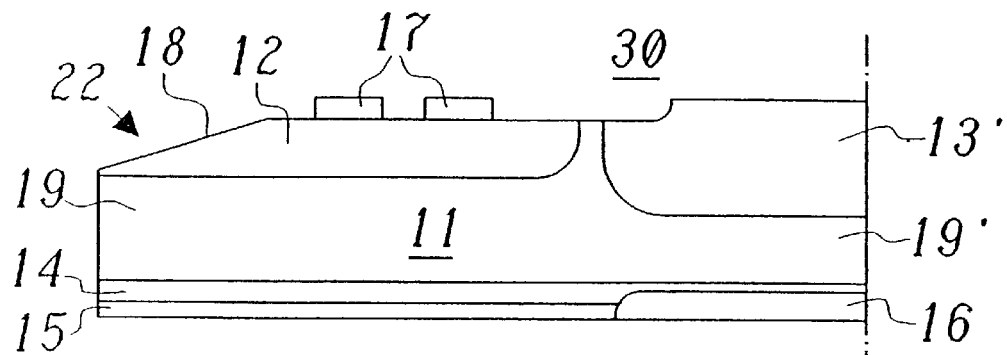
FIG. 4 shows a second exemplary embodiment of a reverse conducting GCT according to the invention with a recessed anode emitter layer in the diode section.

In the case of the reverse conducting GCT 30 in accordance with FIG. 4, the reduction of the avalanche voltage or blocking voltage of the diode is achieved by virtue of the fact that the first anode emitter layer 13' in the diode section is driven more deeply than the third base layer 12 of the GCT into the semiconductor substrate 11 or the first base layer 19'.

Figure 5:
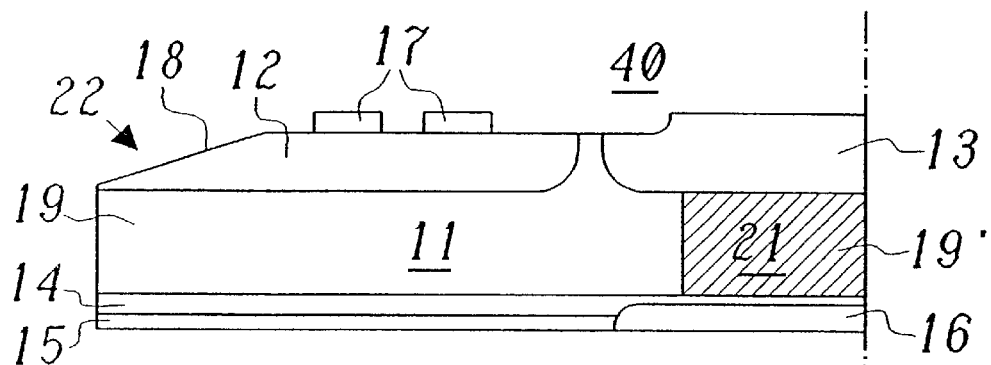
FIG. 5 shows a third exemplary embodiment of a reverse conducting GCT according to the invention with a reduced resistivity in the base layer of the diode section.

In the case of the reverse conducting GCT 40 in accordance with FIG. 5, the reduction of the avalanche voltage or blocking voltage of the diode is achieved by virtue of the fact that the resistivity is reduced in the first base layer 19' in the diode section. This is preferably achieved by a radiation region 21 being produced through subsequent neutron irradiation in this layer.

Figure 6:
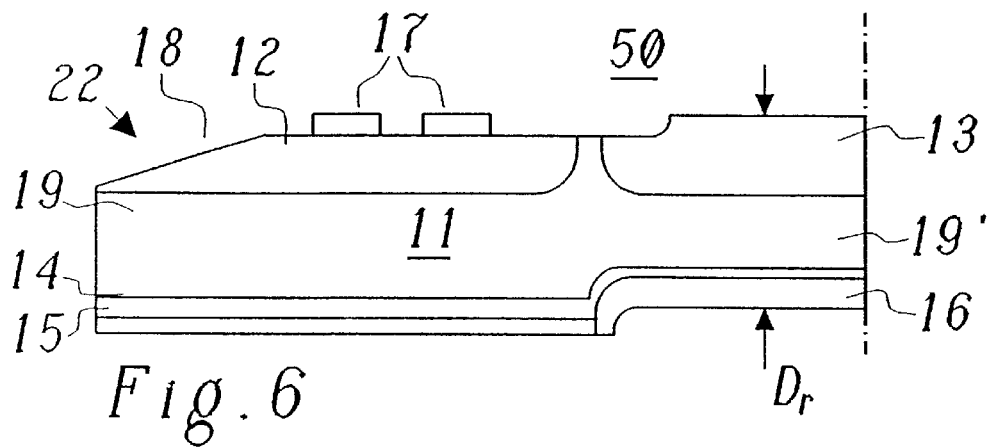
FIG. 6 shows a fourth exemplary embodiment of a reverse conducting GCT according to the invention with a reduced thickness of the semiconductor substrate in the diode section.

Finally, in the case of the reverse conducting GCT 50 in accordance with FIG. 6, the reduction of the avalanche voltage or blocking voltage of the diode is achieved by virtue of the fact that in the diode section, the thickness of the semiconductor substrate 11 is reduced to a reduced thickness $D_r$ relative to the GCT section.

LIST OF REFERENCE SYMBOLS

1 Current source inverter
2 Bridge circuit
3,4 Intermediate circuit inductance
5 Bridge path
6 GCT
7 Diode
8 Ac output
9 capacitor
10,20,30,40,50 gct (reverse conducting)
11 semiconductor substrate
12 base layer (p-doped)
13,13' anode emitter layer (diode; p-doped)
14 stop layer (n-doped)
15 anode emitter layer (gct; $p^+$-doped)
16,16' cathode emitter layer (diode; $n^+$-doped)
17 cathode emitter (gct; $n^+$-doped)
18 edge bevel
19,19' base layer ($n^-$-doped)
21 irradiation region
22 edge termination
gct section
DE diode section

What is claimed is:

1. A reverse conducting GCT for use in a current source inverter comprising a bridge circuit having a plurality of bridge paths, in each of which a controllable power semiconductor component is arranged, wherein the controllable power semiconductor component is avalanche-proof at least under loading in the forward direction; and in which GCT a GCT section (GT) and a reverse-connected parallel diode section (DT) are integrated beside one another in a semiconductor substrate, wherein the diode section (DT) is designed in such a way that its avalanche voltage is lower than the blocking voltage of the GCT section (GT).

2. The current source inverter as claimed in claim 1, wherein the power semiconductor component is a reverse conducting GCT connected in series with a diode.

3. The GCT as claimed in claim 1, wherein the GCT section (GT) in the semiconductor substrate concentrically surrounds the diode element (DE) and has an edge termination, and in that the blocking voltage of the GCT section (GT) corresponds to the blocking voltage of the edge termination.

4. The GCT as claimed in claim 1, wherein the diode section (DT) comprises, one above the other, a cathode emitter layer, a first base layer, and a first anode emitter layer, and in that the avalanche voltage or blocking voltage of the diode section (DT) is reduced by virtue of the cathode emitter layer being driven in a recessed manner into the semiconductor substrate or the first base layer.

5. The GCT as claimed in claim 1, wherein the diode section (DT) comprises, one above the other, a cathode emitter layer, a first base layer, and a first anode emitter layer, and in that the avalanche voltage or blocking voltage of the diode section (DT) is reduced by virtue of the first anode emitter layer being driven in a recessed manner into the semiconductor substrate or the first base layer.

6. The GCT as claimed in claim 1, wherein the diode section (DT) comprises, one above the other, a cathode emitter layer, a first base layer, and a first anode emitter layer, and in that the avalanche voltage or blocking voltage of the diode section (DT) is reduced by virtue of a reduction of the resistivity of the first base layer.

7. The GCT as claimed in claim 1, wherein the avalanche voltage or blocking voltage of the diode section (DT) is effected by a reduction in the thickness of the semiconductor substrate in the region of the diode section (DT).

8. The GCT as claimed in claim 4, wherein the GCT section (GT) comprises, one above the other, a second anode emitter layer, a stop layer, a second base layer, a third base layer and cathode emitters arranged in distributed fashion, the second base layer merging with the first base layer of the diode section (DT), and in that the cathode emitter layer of the diode section (DT) reaches into the first base layer more deeply than the stop layer reaches into the second base layer of the GCT section (GT).

9. The GCT as claimed in claim 5, wherein the GCT section (GT) comprises, one above the other, a second anode emitter layer, a stop layer, a second base layer, a third base layer and cathode emitters arranged in distributed fashion, the second base layer merging with the first base layer of the diode section (DT), and in that the first anode emitter layer of the diode section (DT) reaches into the first base layer more deeply than the third base layer reaches into the second base layer of the GCT section (GT).

10. The GCT as claimed in claim 6, wherein the reduction of the resistivity of the first base layer is effected by neutron irradiation.

11. A current source inverter in combination with the reverse conducting GCT as claimed in claim 1, the current source inverter comprising a bridge circuit having a plurality of bridge paths, in each of which a controllable power semiconductor component is arranged, wherein the controllable power semiconductor component is the reverse conducting GCT in series with a diode.

* * * * *